(12) United States Patent
Tanriseven et al.

(10) Patent No.: US 12,516,998 B2
(45) Date of Patent: Jan. 6, 2026

(54) PRINTING CYLINDER ASSEMBLY

(71) Applicant: MATTHEWS INTERNATIONAL CORPORATION, Pittsburgh, PA (US)

(72) Inventors: Ali Tanriseven, Izmir (TR); Serhan Ozdemir, Izmir (TR)

(73) Assignee: Matthews International Corporation, Pittsburgh, PA (US)

( * ) Notice: Subject to any disclaimer, the term of this patent is extended or adjusted under 35 U.S.C. 154(b) by 75 days.

(21) Appl. No.: 17/802,606

(22) PCT Filed: Feb. 24, 2021

(86) PCT No.: PCT/TR2021/050167
§ 371 (c)(1),
(2) Date: Aug. 26, 2022

(87) PCT Pub. No.: WO2021/173101
PCT Pub. Date: Sep. 2, 2021

(65) Prior Publication Data
US 2023/0137598 A1 May 4, 2023

(30) Foreign Application Priority Data
Feb. 28, 2020 (TR) .................. 2020/03061

(51) Int. Cl.
*G01M 1/14* (2006.01)
*B41F 33/00* (2006.01)
(52) U.S. Cl.
CPC ............... *G01M 1/14* (2013.01); *B41F 33/00* (2013.01)
(58) Field of Classification Search
CPC . G01M 1/14; G01M 1/22; B41F 33/00; B41F 33/009; G01D 21/02
See application file for complete search history.

(56) References Cited

U.S. PATENT DOCUMENTS 5,699,729 A 12/1997 Moschel
6,112,655 A 9/2000 Suzuki et al.
(Continued)

FOREIGN PATENT DOCUMENTS

DE 202007001066 U1 5/2008
EP 0978589 A2 2/2000
(Continued)

OTHER PUBLICATIONS

International Search Report and Written Opinion of the ISA issued in PCT/TR2021/050167, mailed Jun. 10, 2021; ISA/TR.
(Continued)

*Primary Examiner* — Stephen D Meier
*Assistant Examiner* — Quang X Nguyen
(74) *Attorney, Agent, or Firm* — Jones Day

(57) ABSTRACT

A printing cylinder assembly for detecting existing and/or developing errors during printing comprising at least one printing cylinder which is suitable for printing on a material, and has at least one cylindrical body, at least one shaft forming a rotational axis for the body, and characterized by the printing cylinder which has at least one cavity extending from the surface of the body towards its interior volume, at least one sensor which is suitable for being placed in the said cavity, at least one communication interface which is suitable for communicating with an external device, at least one control unit which is adapted to receive data from the sensor, and transfer these data to an external device via the communication interface directly and/or by processing them, and at least one power supply which is for supplying the power needed by the sensor, the communication interface and/or the control unit.

22 Claims, 2 Drawing Sheets

(56) References Cited

U.S. PATENT DOCUMENTS

Figure 1:
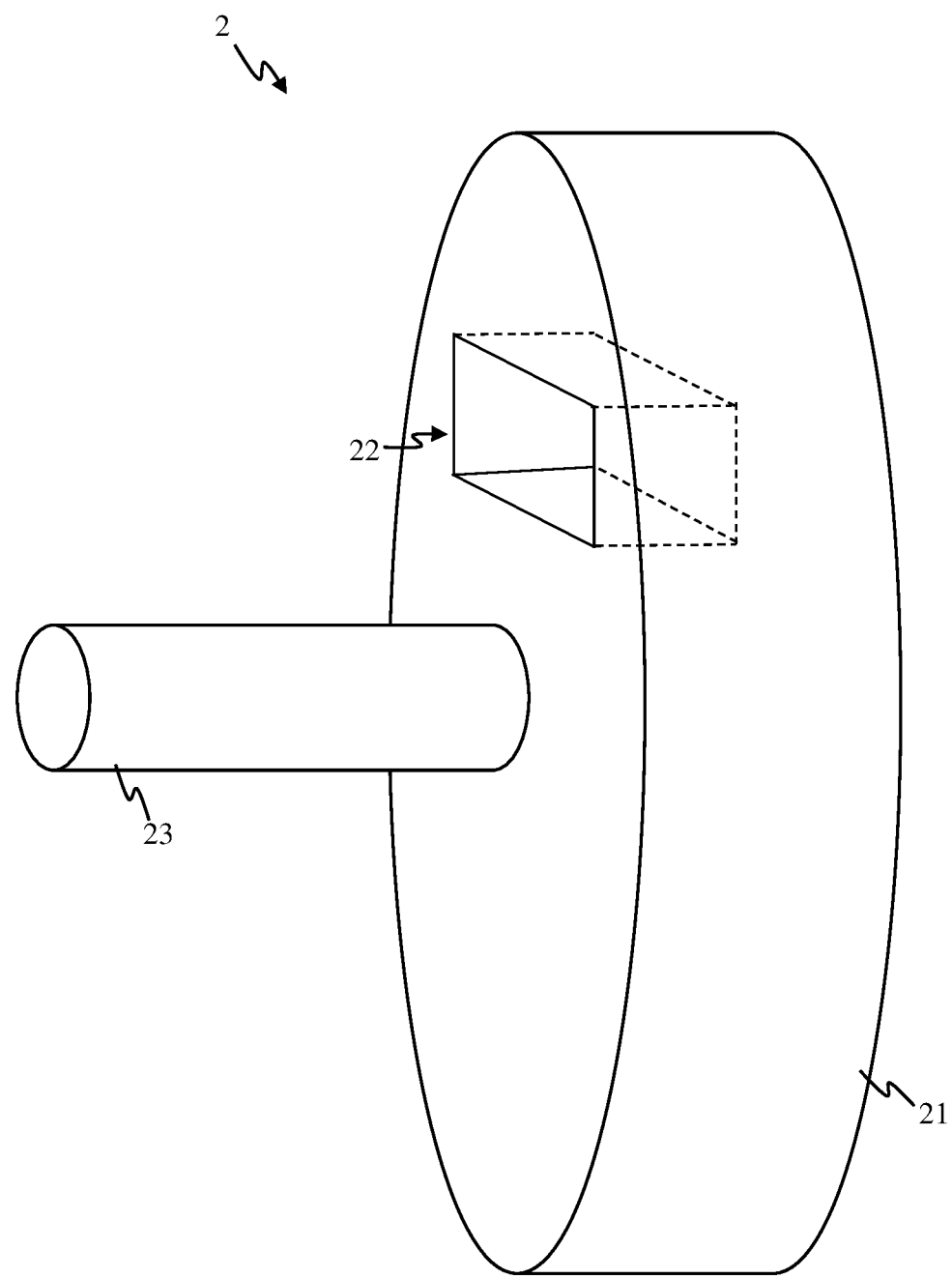

| | | | |
|---|---|---|---|
| 2002/0063381 A1 | 5/2002 | Henn | |
| 2006/0090574 A1* | 5/2006 | Moore | G01K 1/024 |
| | | | 492/50 |
| 2009/0320612 A1 | 12/2009 | Moore et al. | |
| 2015/0048952 A1* | 2/2015 | Murphy | G08B 21/182 |
| | | | 340/682 |
| 2015/0316429 A1 | 11/2015 | Figiel | |
| 2018/0045591 A1* | 2/2018 | Figiel | G01L 5/0028 |
| 2019/0240672 A1* | 8/2019 | Reiter | B02C 4/30 |
| 2021/0061027 A1* | 3/2021 | Da Deppo | B60C 23/041 |

FOREIGN PATENT DOCUMENTS

| | | |
|---|---|---|
| EP | 2168768 A2 | 3/2010 |
| JP | 2004-243737 | 9/2004 |
| KR | 10-2018-0063095 | 6/2018 |

OTHER PUBLICATIONS

UA patent office; Appl. a 2022 03383; Office Action; Jul. 5, 2024.
KIPO, Appl. 10-2022-7032561, Notice of Preliminary Rejection, Jan. 2, 2025.

\* cited by examiner

PRINTING CYLINDER ASSEMBLY

CROSS-REFERENCE TO RELATED APPLICATIONS

This application is a U.S. National Phase Application under 35 U.S.C. 371 of International Application No. PCT/TR2021/050167 filed on Feb. 24, 2021, which claims the benefit of Turkish Patent Application No. 2020/03061, filed on Feb. 28, 2020. The entire disclosures of the above applications are incorporated herein by reference.

FIELD OF THE INVENTION

The present invention relates to a printing cylinder assembly for detecting errors during printing.

BACKGROUND OF THE INVENTION

Printing cylinders are apparatuses which allow a pattern to be applied on a material. The printing cylinder rotates around an axis, and as a result of this rotational movement, receives ink from a reservoir and then transfers the said ink onto the material with the pattern it has.

The printing having the desired quality depends on the balance of this rotational movement of the printing cylinder. However, parameters such as changes in ambient temperature, improper mounting, runout or vibration of the printing cylinder may cause the balance to be disrupted. When this balance is disrupted, the print does not have the desired quality.

In the state of the art, when the print does not have the desired quality, the user removes the printing cylinder and sends it to the manufacturer to diagnose the problem. This leads to an increase in production costs as it requires stopping the printing. Furthermore, the process of sending the printing cylinder to the manufacturer is time consuming and costly. Therefore, a printing cylinder assembly is needed in order to determine the cause of errors during printing without sending the printing cylinder to the manufacturer.

European patent document no EP0978589, an application known in the state of the art, discloses a sensor system which enables to actively reduce the unwanted vibrations in a rotating roller. The sensor system apparatus of the invention comprises at least one sensor provided inside the circular mantle of the roller and/or at least one external sensor provided inside a gap on the surface of the roller mantle.

European patent document no EP2168768, an application known in the state of the art, discloses an application of a control device for offset printing machine. The control system has a temperature measuring sensor, and this sensor collects temperature signals determining temperature characteristics on the cylinder surface.

There is no structure for detecting existing and/or developing errors in the printing cylinders known in the state of the art.

SUMMARY OF THE INVENTION

The objective of the present invention is to provide a printing cylinder assembly for detecting existing and/or developing errors during printing.

DETAILED DESCRIPTION OF THE INVENTION

Figure 2:
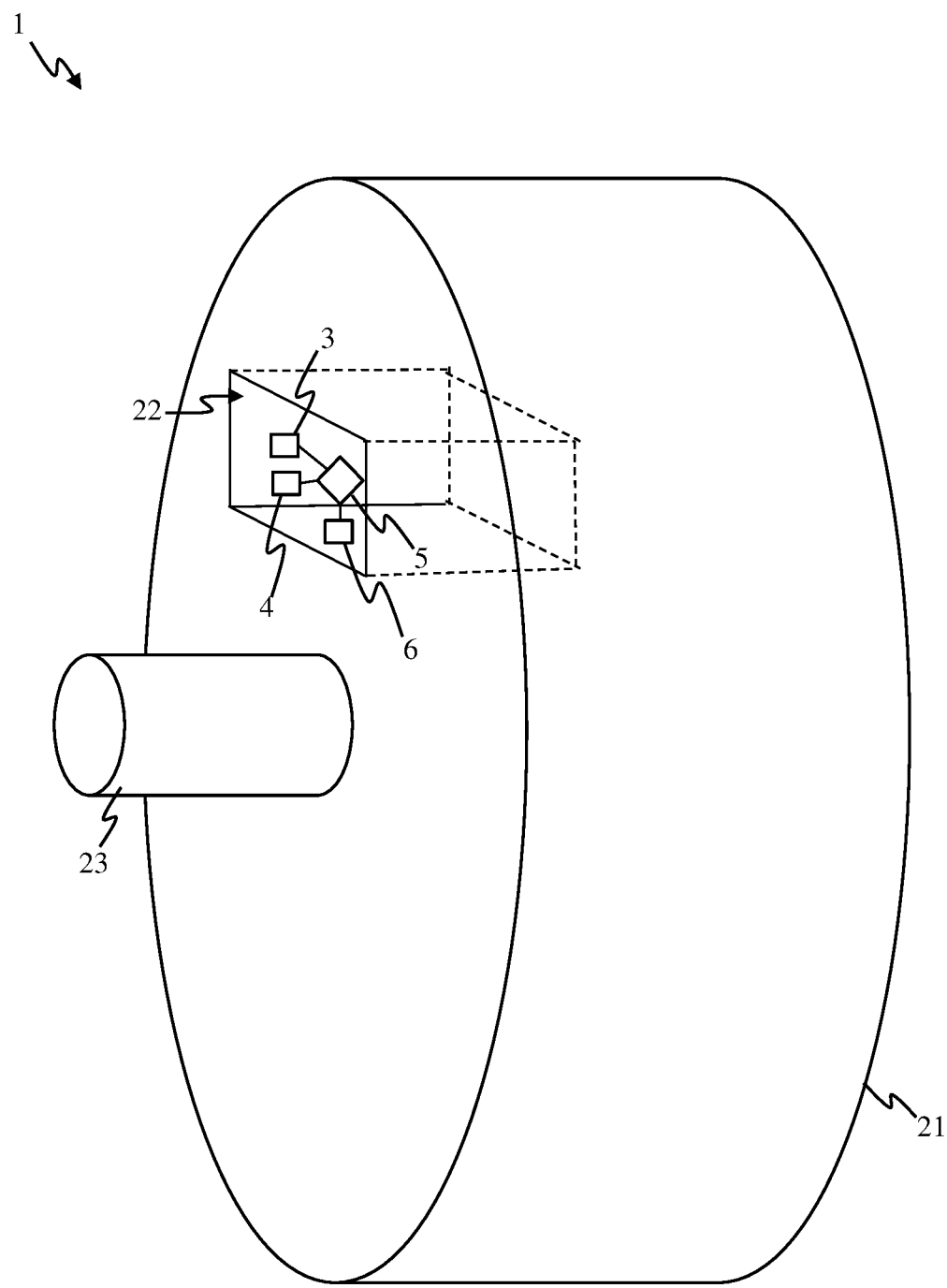

The printing cylinder assembly provided in order to achieve the objectives of the present invention is illustrated in the accompanying drawings, in which:

FIG. 1 is the perspective view of the printing cylinder.
FIG. 2 is the perspective view of the printing cylinder assembly.

The components shown in the figures are each given reference numbers as follows:
1. Printing cylinder assembly
2. Printing cylinder
   21. Body
   22. Cavity
   23. Shaft
3. Sensor
4. Communication interface
5. Control unit
6. Power supply The printing cylinder assembly (1) for detecting existing and/or developing errors during printing comprises
- at least one printing cylinder (2) which is suitable for printing on a material, and has at least one cylindrical body (21), at least one shaft (23) forming a rotational axis for the body (21), and at least one cavity (22) extending from the surface of the body (21) towards its interior volume,
- at least one sensor (3) which is suitable for being placed in the said cavity (22),
- at least one communication interface (4) which is suitable for communicating with an external device,
- at least one control unit (5) which is adapted to receive data from the sensor (3), and transfer these data to an external device via the communication interface directly and/or by processing them,
- at least one power supply (6) which is for supplying the power needed by the sensor (3), the communication interface (4) and/or the control unit (5).

The printing cylinder assembly (1) for detecting existing and/or developing errors during printing comprises at least one printing cylinder (2) which is suitable for printing on a material. The said printing cylinder (2) has at least one cylindrical body (21), and at least one shaft (23) forming a rotational axis for the body (21).

The cylindrical body (21) has at least one cavity (22) extending from its surface towards its interior volume. The said cavity (22) can extend from the bottom, top or the side surface of the body (21) towards the interior volume of the body (21). The said cavity (22) preferably extends from the bottom or top of the body (21) towards the interior volume of the body (21).

The printing cylinder assembly (1) of the present invention comprises at least one sensor (3) which is suitable for being placed in the said cavity (22). The said sensor (3) is a suitable sensor for measuring at least acceleration, speed and/or temperature data. The printing cylinder assembly (1) may comprise a separate sensor (3) for each data desired to be measured, as well as it may also comprise a sensor (3) suitable to measure more than one data at the same time or a combination of these sensors (3).

The printing cylinder assembly (1) of the present invention comprises at least one communication interface (4) suitable for communicating with an external device. Thanks to this communication interface (4), the data received from the sensors (3) can be transferred to an external device directly or by being processed. The said communication interface (4) may be a wired communication interface such as USB, rs-232, etc. and/or it may be a wireless communication interface such as Bluetooth, zigbee, Wi-Fi, RF, etc. It is, of course, obvious that interfaces other than the examples described above can also be used with the present invention.

The printing cylinder assembly (1) of the present invention comprises at least one control unit (5) which is adapted to receive data from the sensor (3) and transfer these data to an external device via the communication interface (4) directly and/or by processing them.

The power needed by the sensor (3), the communication interface (4) and/or the control unit (5) is supplied by at least one power supply (6). The said power supply (6) can be a battery and/or an inductive power supply. In case an inductive power supply is used as the power supply (6), an external magnetic field must be applied to the said inductive power supply. Furthermore, the said inductive power supply can also be used for charging the said battery.

In an embodiment of the invention, the sensor (3) measuring the vibrations of the printing cylinder (2) during operation is an accelerometer. In this embodiment, the sensor (3) that measures the speed of the printing cylinder (2) can be the said accelerometer or a separate speed sensor. The said speed sensor can be any speed sensor, such as a reed switch and magnet pair or an optical pair. The sensor (3) can provide an analog and/or digital data corresponding to the value desired to be measured or a representation of this value. In other words, the data provided by the sensor (3) can be an analog voltage value corresponding to the measured value, the number of pulses provided within a predetermined time or a data transmitted over a data bus. In addition, the sensor (3) may provide the said data wirelessly.

The control unit (5) can transfer the data received from the sensor (3) to an external device via the communication interface (4) upon processing it or in raw form. The control unit (5) can also store the said data in a memory unit, and, when a connection is established with an external device, it can transfer the data contained in the memory unit to the external device collectively or partially. In this embodiment, the printing cylinder assembly (1) of the present invention comprises at least one memory unit suitable for data storage therein. The said external device can be a standard device such as a computer, mobile phone, tablet, as well as it can be a terminal adapted to receive data via the communication interface (4). In addition, the communication interface (4) can also be connected to an external device suitable for connecting to a remote network such as a modem. Therefore, the desired data can be obtained by connecting to the printing cylinder assembly (1) of the present invention from a remote device.

In an embodiment of the present invention, one, several or all of the sensor (3), communication interface (4), control unit (5) and power supply (6) are located inside the cavity (22). The cavity (22) is filled with a polymeric material such as epoxy to ensure that the components therein remain fixed.

The control unit (5) and/or the external device can detect existing and/or developing errors by interpreting the data provided by the sensor (3). For example, if the vibrations during the rotation of the printing cylinder (2) are higher than a predetermined value, this situation can be interpreted as an error. If the said vibration value is higher than a minimum value but lower than a maximum value, this can be interpreted as the printing cylinder (2) develops an error. The data provided by the sensor (3) can also provide information about the service life and conditions of the printing cylinder (2).

In an embodiment of the present invention, the printing cylinder assembly (1) of the present invention comprises at least one clock signal generator in order to provide time data as well as the data provided by the sensor (3).

The error detection method of the present invention comprises the steps of detecting whether the printing cylinder (2) has started to rotate or not by means of the sensor (3), measuring the time elapsed during operation by means of clock signals in case the printing cylinder (2) has started to rotate, receiving acceleration and temperature data from the sensor, comparing the acceleration data with the reference acceleration data, determining whether there is a balance problem as a result of this comparison, determining the balance region and intensity in case there is a balance problem, informing the operator that there is a balance problem.

In the step of determining the balance region and its intensity in case there is balance problem, the change of the acceleration data in two axes is evaluated. An application wherein the printing cylinder (2) is divided into regions such as a unit circle can be considered as an example. Let's assume that the acceleration change in the x and y axes is considered in this application. It can be concluded that the imbalance is in the $1^{st}$ quadrant if the acceleration in the x axis ($a_x$) and the acceleration in the y axis ($a_y$) increase together, it is in the $2^{nd}$ quadrant if $a_y$ increases while $a_x$ decreases, it is in the $3^{rd}$ quadrant if $a_x$ and $a_y$ decrease together, and it is in the $4^{th}$ quadrant if $a_y$ decreases while $a_x$ increases.

In the error detection method, it is possible to conduct measurement for a predetermined period of time, and then allow the control unit (5) to sleep for a predetermined period of time. For example, after measuring for 5 seconds, the control unit (5) may be allowed to sleep for 55 seconds. For this, the time measured via the said clock signals is used. The said time periods are only examples. Measurement and sleep periods can be changed as desired.

In the error detection method, after the determination of the region and intensity of the balance, the user can be informed about the region and intensity of the balance, and furthermore the user can be guided about how much weight should be attached to which region in order to eliminate the said balance.

In an embodiment of the invention which can be used in combination with the other embodiments, the printing cylinder (2) comprises at least one mounting hole which is suitable for mounting at least one weight, preferably on the top and/or bottom of its body (21). There are preferably at least eight mounting holes, being at least one in each quadrant in the circular cross section of the cylindrical body (21). However, it is obvious that it can also be more or less.

In an embodiment of the present invention, in order to determine the useful life of the printing cylinder (2) and/or the pattern on the printing cylinder (2) and therefore the printing quantity, the operating parameters of the printing cylinder (2) having the said pattern can be recorded throughout the life of the printing cylinder (2). Therefore, how the printing cylinder (2) behaves at which operating parameters can be recorded, and thus, information about the useful life of the printing cylinder (2) and/or the pattern and their potential of failure during this lifetime is acquired. This in turn enables to determine how efficient the said printing cylinder (2) operates, thereby determining the cost of a printing job efficiently. In addition, thanks to these data, the design of the printing cylinder (2) and/or the pattern, as well as the optimum design and operating conditions of the said printing cylinder (2) and/or the pattern can be determined. The said design is the data such as the hardness of the copper, the engraving diamond angle, the hardness of chrome, the thickness of the chrome, etc., used in the said pattern but is not limited to these.

The invention claimed is:

1. A printing cylinder assembly for detecting existing and/or developing errors during printing comprising:
    at least one printing cylinder configured to print on a material, and has at least one cylindrical body, at least one shaft forming a rotational axis for the body, and characterized by
    the printing cylinder having a curved surface and two end surfaces, the cylinder having at least one cavity extending into a first end surface of the cylindrical body towards its interior volume,
    at least one acceleration sensor configured to be placed in the said cavity,
    at least one communication interface configured to communicate with an external device,
    at least one control unit which is adapted to receive data from the sensor, and process the data to identify and indicate a region of imbalance in the printing cylinder,
    at least one power supply which is for supplying the power needed by the sensor, the communication interface and/or the control unit.

2. The printing cylinder assembly according to claim 1, characterized in that it further comprises a separate sensor for each data desired to be measured and/or a sensor configured to measure more than one data at the same time or a combination of these sensors.

3. The printing cylinder assembly according to claim 2, characterized in that the separate sensor is a speed sensor configured for measuring the speed of the printing cylinder.

4. The printing cylinder assembly according to claim 2, characterized by the separate sensor being a temperature sensor.

5. The printing cylinder assembly according to claim 1, characterized by the power supply which is a battery and/or an inductive power supply.

6. The printing cylinder assembly according to claim 1, characterized by the power supply which is an inductive power supply configured to charge the said battery.

7. The printing cylinder assembly according to claim 1, characterized by the sensor which is an accelerometer for measuring the vibrations of the printing cylinder during operation.

8. The printing cylinder assembly according to claim 1, characterized by the sensor which provides an analog and/or digital data corresponding to the value desired to be measured or a representation of the said value.

9. The printing cylinder assembly according to claim 8, characterized by the sensor configured to transfer the said data wirelessly.

10. The printing cylinder assembly according to claim 1, characterized by the control unit configured to transfer the data it receives from the sensor to an external device via the communication interface by processing and/or in raw form.

11. The printing cylinder assembly according to claim 10, comprising at least one memory unit configured to store the said data therein.

12. The printing cylinder assembly according to claim 11, characterized by the control unit configured to transfer the data in the memory unit to an external device collectively or partially when a connection is established with the external device.

13. The printing cylinder assembly according to claim 10, comprising at least one clock signal generator in order to provide time data.

14. The printing cylinder assembly according to claim 1, characterized by at least one polymeric material which fills the cavity in order to enable the components therein to remain fixed.

15. The printing cylinder assembly according to claim 1, characterized by the printing cylinder which has at least one mounting hole on top and/or bottom of its body that is configured to mount at least one weight.

16. The printing cylinder assembly according to claim 15, characterized by the printing cylinder which has at least eight mounting holes, being at least one in each quadrant in the circular cross section of the cylindrical body.

17. An error detection method, which is executed by the control unit of a printing cylinder assembly according to claim 1, characterized by the steps of
    detecting whether the printing cylinder has started to rotate or not by means of a sensor,
    measuring the time elapsed during operation by means of clock signals in case the printing cylinder has started to rotate,
    receiving acceleration and temperature data from the sensor, comparing the acceleration data with the reference acceleration data,
    determining whether there is a balance problem as a result of this comparison,
    determining the balance region and intensity in case there is a balance problem,
    informing the operator that there is a balance problem.

18. The error detection method according to claim 17, characterized by the step of informing the user about the region and intensity of the balance after the determination of the region and intensity of the balance, and furthermore guiding the user about how much weight should be attached to which region in order to eliminate the said balance.

19. The printing cylinder assembly according to claim 1, wherein the sensor is entirely within the cavity.

20. The printing cylinder assembly according to claim 1, wherein the sensor is configured to measure acceleration data.

21. The printing cylinder assembly according to claim 1, wherein the sensor is configured to measure speed data.

22. The printing cylinder assembly according to claim 1, wherein the cylindrical body comprises a single piece.

* * * * *